United States Patent
Kopp et al.

(10) Patent No.: US 8,713,918 B2
(45) Date of Patent: May 6, 2014

(54) DEVICE FOR PURIFICATION OF EXHAUST GASES OF AN INTERNAL COMBUSTION ENGINE

(75) Inventors: Andre Kopp, Neckarsulm (DE); Viktor Schimik, Heilbronn (DE); Maarten Van De Burgt, Heilbronn (DE)

(73) Assignee: Audi AG, Ingolstadt (DE)

( * ) Notice: Subject to any disclaimer, the term of this patent is extended or adjusted under 35 U.S.C. 154(b) by 508 days.

(21) Appl. No.: 12/667,013

(22) PCT Filed: Apr. 4, 2008

(86) PCT No.: PCT/EP2008/002685
§ 371 (c)(1),
(2), (4) Date: Jun. 21, 2010

(87) PCT Pub. No.: WO2009/003544
PCT Pub. Date: Jan. 8, 2009

(65) Prior Publication Data
US 2010/0313550 A1     Dec. 16, 2010

(30) Foreign Application Priority Data
Jun. 29, 2007   (DE) .......................... 10 2007 030 442

(51) Int. Cl.
*F01N 3/00* (2006.01)
(52) U.S. Cl.
USPC .................. 60/286; 60/287; 60/295; 60/301; 60/303
(58) Field of Classification Search
USPC ..................... 60/286, 287, 295, 299, 301, 303
See application file for complete search history.

(56) References Cited

U.S. PATENT DOCUMENTS

| | | | |
|---|---|---|---|
| 5,657,625 A * | 8/1997 | Koga et al. | 60/274 |
| 6,192,675 B1 * | 2/2001 | Hirota et al. | 60/286 |
| 7,334,400 B2 * | 2/2008 | Yan et al. | 60/286 |
| 7,650,746 B2 * | 1/2010 | Hu et al. | 60/286 |
| 7,891,172 B2 * | 2/2011 | Toshioka et al. | 60/286 |
| 7,908,844 B2 * | 3/2011 | Kamoshita et al. | 60/286 |
| 7,971,427 B2 * | 7/2011 | Sugiyama | 60/286 |
| 8,079,213 B2 * | 12/2011 | Tsujimoto et al. | 60/295 |

FOREIGN PATENT DOCUMENTS

| | | |
|---|---|---|
| EP | 1602403 A | 12/2005 |
| GB | 1444362 A | 7/1976 |
| WO | 0232552 A | 4/2002 |
| WO | 02075124 A | 9/2002 |
| WO | 2004022933 A | 3/2004 |
| WO | 2004061278 A | 7/2004 |
| WO | 2007145372 A | 12/2007 |

* cited by examiner

*Primary Examiner* — Binh Q Tran
(74) *Attorney, Agent, or Firm* — Novak Druce Connolly Bove + Quigg LLP

(57) ABSTRACT

The invention relates to a device for purification of exhaust gases for the exhaust gas line of an internal combustion engine, with an exhaust gas channel which is made multi-flow in a specified region and has several component exhaust gas lines, and with a metering device by means of which a specified amount of a reducing agent can be metered into the exhaust gas channel in the region upstream from the catalytic converter arrangement at specified times. According to the invention, a metering channel which branches off from the single metering device is assigned to each of the component exhaust gas lines, and a specified proportion of the amount of metered reducing agent can be supplied to each component exhaust gas line via the metering channels.

9 Claims, 1 Drawing Sheet

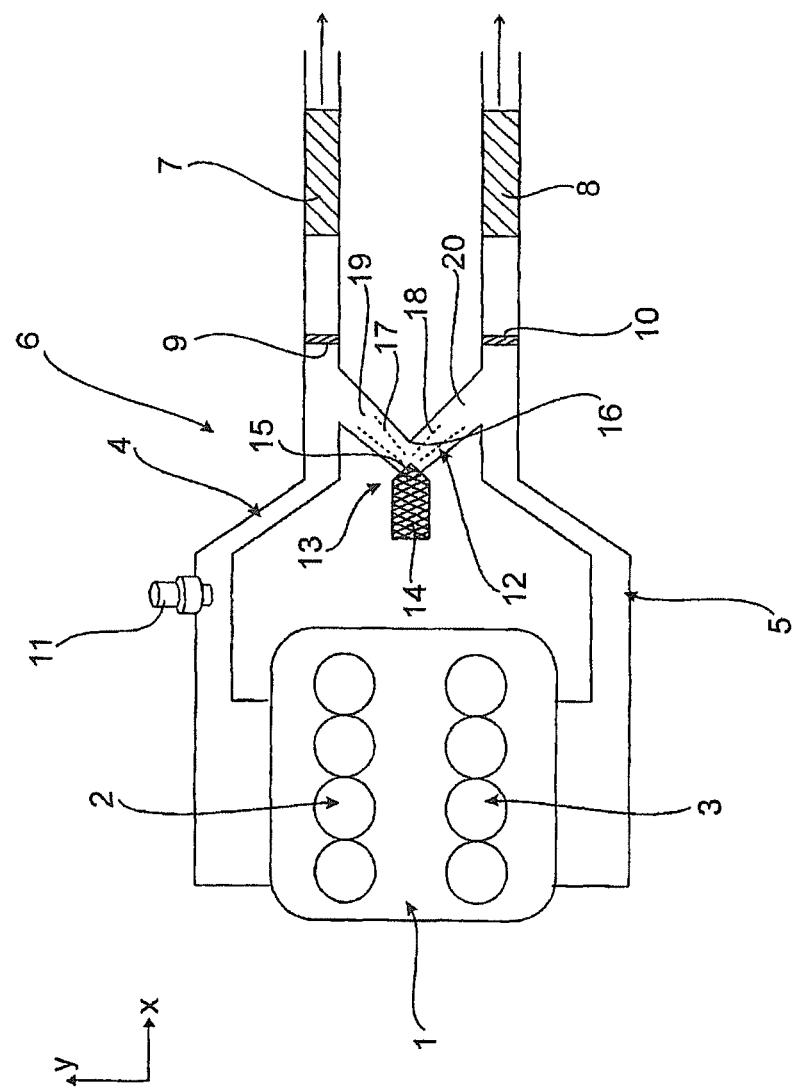

DEVICE FOR PURIFICATION OF EXHAUST GASES OF AN INTERNAL COMBUSTION ENGINE

The invention relates to a device for purification of exhaust gases for an exhaust gas line of an internal combustion engine.

BACKGROUND OF THE INVENTION

The generic DE 103 00 298 A1 discloses a device for purification of exhaust gases for an exhaust gas line of an internal combustion engine which has a double-flow exhaust gas line, each segment of the line having a NOx storage catalytic converter, a $NO_2$ producing catalytic converter, a SCR catalytic converter and a metering device for metering of a reducing agent. This structure is designed to ensure that the SCR catalytic converter with the stored ammonia can reduce the nitrogen oxides which are still contained in the exhaust gas flow downstream from the NOx storage catalytic converter, with the ammonia being simultaneously oxidized. A separate sensor is assigned to each of the catalytic converters in each of the component exhaust gas lines. This structure which is shown in FIG. 5 of DE 103 00 298 A1 is very complex and is thus expensive to produce both in terms of component engineering and also control engineering.

A similar structure is also disclosed in EP 1 055 806 A2 in which the liquid reducing agent is supplied in a controlled manner from a storage tank via metering valves which are assigned to each component exhaust gas line of a double-flow exhaust gas line. A structure which is essentially identical thereto is known from DE 199 57 539 A1 (FIG. 3). These structures thus likewise have the aforementioned disadvantages.

In contrast, the object of this invention is to make available a device for purification of exhaust gases for the exhaust gas line of an internal combustion engine, by means of which exhaust gas purification can be implemented in a structurally simple manner with high operating reliability.

SUMMARY OF THE INVENTION

According to the present invention, it is provided that each of the component exhaust gas lines is assigned at least one metering channel which branches off from a metering region of a single metering device, preferably one metering channel at a time which branches off from a metering region of a single metering device discharges into each of the component exhaust gas lines, and via which a specified proportion of the metered amount of reducing agent can be supplied to each component exhaust gas line.

With this structure, metering of the reducing agent, which can be reliably managed into several component exhaust gas lines, can take place solely with a single metering device such that a separate metering line is not necessary for each component exhaust gas line. Thus the component cost and at the same time also the control effort necessary for control of the individual metering lines can be reduced significantly.

Essentially, the individual component exhaust gas lines can be made and laid out differently so that different flow conditions can be set in the individual component exhaust gas lines. In this case, it can be ensured by the corresponding triggering and design of the metering device and the metering channels that a suitable amount of reducing agent matched to the respective flow conditions in the component exhaust gas line is metered. According to one especially preferred configuration of the invention, it is, however, provided that the individual component exhaust gas lines are laid out and equipped identically, proceeding preferably from the internal combustion engine or from the branching site of the individual component exhaust gas lines at least up to and including the catalytic converter region and thus, figuratively speaking, are made identical as the same parts. With this identical and symmetrical layout of the exhaust gas lines essentially identical flow conditions in the individual exhaust gas lines are easily obtained so that in each exhaust gas line essentially identical reducing performance is achieved. Particularly in conjunction with these identically made exhaust gas lines a further special advantage arises: Here, only in one of the component exhaust gas lines does the corresponding sensor, in particular a $NO_2$ sensor, need be provided, since the sensors or sensor devices located in this exhaust gas line yield results which are essentially identical and thus comparable to conditions in the other component exhaust gas lines.

In conjunction with the identical execution of the component exhaust gas lines, it is especially advantageous that each of the component exhaust gas lines is supplied with an essentially identical amount of reducing agent at identical times for identical time intervals. Accordingly, the supply channels which branch off from the individual metering device can be made identical according to the component exhaust gas lines in terms of the same parts and in terms of a symmetrical execution, so that likewise identical flow conditions prevail in the metering channels. This is especially necessary if the sensors are intended only for one of several component exhaust gas lines.

To ensure that a specified, preferably the same amount of reducing agent is supplied via the metering channels into the respectively assigned component exhaust gas lines, in the region in which the individual metering device joins to the junction region or gusset region of one metering region from which the individual metering channels branch off, there can also be additional auxiliary means which support or manage the division of the metered amount of reducing agent into individual component flows. For example, they can be flap-shaped separating elements or baffles or similar other separating means. For example, the jet of liquid reducing agent metered by means of the metering device is directed at a region of the gusset or junction region which is made as a separating element, preferably as a gusset edge such that the flow of reducing agent is divided into a number of component flows which corresponds to the number of component exhaust gas lines. Especially preferably, in this case the metering device then is located exactly opposite the separating element or the gusset edge. Optionally, in conjunction with this configuration it can also be provided that the jet of reducing agent is made variably adjustable with respect to the angle of incidence on the separating element, so that different amounts of component flows can be achieved in the individual component exhaust gas lines.

The individual, preferably two metering channels are preferably components of a single pipe arrangement.

Especially preferably, according to one specific configuration, there are two identical component exhaust gas lines which form a double-flow exhaust gas system. These two component exhaust gas lines preferably have the same vertical position and lie in the same horizontal plane of the vehicle spanned by the longitudinal axis of the vehicle and the transverse axis of the vehicle. In this way, the same flow conditions can be configured in the individual component exhaust gas lines. In conjunction with this configuration it is moreover especially advantageous that the single metering device is located in the middle between the two component exhaust gas lines, preferably likewise in the horizontal plane of the vehicle.

The reducing agent is preferably in liquid form, for example as an aqueous urea solution or in the form of ammonia. But fundamentally metering of the reducing agent in a finely atomized or gaseous form would also be possible.

The catalytic converter arrangement itself can be formed by a catalytic converter which is located in each component exhaust gas line and which, in particular, is a SCR catalytic converter, with which within the scope of so-called selective catalytic reduction (SCR) NOx conversion takes place in a lean atmosphere. But fundamentally it would also be possible to combine the individual component exhaust gas lines into a single-flow exhaust gas line and then to provide the catalytic converter, in particular a SCR catalytic converter, in the single-flow region. This can be the case, for example, when the internal combustion engine is formed by a V-type engine from which two exhaust gas lines branch off. In conjunction with the execution according to the invention and with providing metering channels which branch off proceeding from the individual metering device, advantageous pollutant reduction, in particular nitrogen oxide reduction, would accordingly also be possible.

According to one especially preferred specific configuration, the single metering device is formed by a metering valve, by means of which the reducing agent which is to be metered is injected or sprayed in. This metering valve is conventionally coupled to a control device, in particular an engine control device, and thus can be easily controlled as part of the engine management which is to be provided at any rate.

In order to achieve especially effective mixing of the metered reducing agent in the individual component exhaust gas lines, it can moreover also be provided that in each component exhaust gas flow there is at least one mixing means which is designed in particular as a static mixer, by means of which effective and uniform mixing of the reducing agent and component gas flow can take place.

BRIEF DESCRIPTION OF THE DRAWINGS

The sole FIGURE schematically shows an internal combustion engine 1 which is constructed as a V-type engine. One component exhaust gas line 4, 5 branches off from each cylinder bank 2, 3 so that in this way a double-flow exhaust gas line 6 is formed.

DETAILED DESCRIPTION OF THE PREFERRED EMBODIMENTS OF THE INVENTION

As can be very easily seen from the schematic of FIG. 1, the two component exhaust gas lines 4, 5 are made and laid out identically with respect to shape, curvature, cross section and operating parts, i.e., that in each of the component exhaust gas lines 4, 5 at the identical location in the flow path of the component exhaust gas lines 4, 5 there is an identically designed SCR catalytic converter 7, 8 to which likewise in turn, in the identical manner, an identical static mixer 9, 10 respectively is connected upstream in each component exhaust gas line 4, 5.

The two component exhaust gas lines 4, 5 are preferably located in the horizontal plane of the vehicle which is spanned by the longitudinal axis x of the vehicle and the transverse axis y of the vehicle.

As can be further seen from FIG. 1, between the two component exhaust gas lines 4, 5, lying preferably likewise in the horizontal plane of the vehicle, there is a so-called connecting or cross pipe 12 which is V-shaped and has a gusset region 13 from which identically made metering channels 19, 20 as V-legs discharge into the component exhaust gas lines 4, 5. The gusset region 13 is located preferably exactly in the middle between the two component exhaust gas lines 4, 5 and holds a metering valve 14 whose valve nozzle 15 is pointed at the opposite gusset edge so that an amount of the liquid reducing agent which is metered by means of the metering valve 14 exactly strikes the gusset edge 16 and divides the flow of the reducing agent preferably into two essentially identical component flows 17, 18 of the reducing agent. These component flows 17, 18 flow via metering channels 19, 20 which branch off from the gusset region 13 into the respectively assigned component exhaust gas lines 4, 5 in order to mix there with the respective component flow of exhaust gas of the cylinder banks 2, 3 before this mixture then flows into and through the respective SCR catalytic converter 7, 8 for selective catalytic reduction as a mixture of reducing agent and exhaust gas.

The sole difference between the two otherwise identically designed, equipped and executed component exhaust gas line 4, 5 consists in that only in one of the component exhaust gas lines 4, 5—here, for example, in the component exhaust gas line 4—a NOx sensor 11 is provided, by means of which the nitrogen oxide concentration in the exhaust gas is sensed. As a result of the identical or symmetrical execution of the component exhaust gas lines 4, 5, identical flow conditions and ratios as well as flow compositions arise in them so that for sensing of the nitrogen oxide concentration in the exhaust gas and for checking the exhaust gas-relevant components, it is sufficient for self-diagnosis to examine and sense only one of the two component exhaust gas flows.

For example, an aqueous urea solution is metered as the reducing agent here.

The invention claimed is:

1. An exhaust gas system for an internal combustion engine, comprising:
a pair of exhaust gas lines each emanating from a separate set of cylinders of said engine, and extending rearwardly, each spaced laterally of a longitudinal centerline of said engine and provided with a catalytic converter;
a fluid line intercommunicating said laterally spaced lines upstream of the catalytic converters therein, having an interior surface provided with a v-shaped cross-sectional configuration functional to divert a fluid impinging thereon laterally into branch sections communicating with said laterally spaced lines; and
means for injecting a reducing agent into said intercommunicating line, directed to said v-shaped surface substantially equally diverting said injected reducing agent through said branch sections.

2. The system according to claim 1 wherein said exhaust gas lines and said intercommunicating line lie in the same horizontal plane.

3. The system according to claim 1 wherein said intercommunicating line is centered on said longitudinal centerline.

4. The system according to claim 1 including a $NO_x$ sensor disposed in one of said exhaust gas lines upstream of the connection of said intercommunicating line with said exhaust gas line.

5. The system according to claim 1 including a static mixer disposed in each of said exhaust gas lines between the connection of said intercommunicating line and said catalytic converter thereof.

6. The system according to claim 4 wherein said injecting means is functional responsive to said sensor.

7. The system according to claim 1 wherein each of said catalytic converters comprises a SCR catalytic converter.

8. The system according to claim 1 wherein said reducing agent consists of one of a liquid, aqueous urea solution and ammonia.

9. The system according to claim 1 wherein said engine is a v-type engine consisting of one of 8, 10 and 12 cylinders.

\* \* \* \* \*